S. M. SMITH.
BLOCK HOOK.
APPLICATION FILED JAN. 8, 1917.
1,246,174. Patented Nov. 13, 1917.
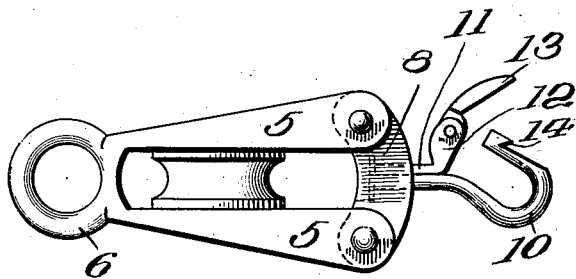
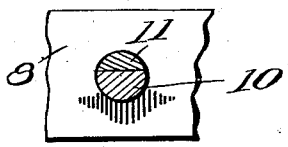
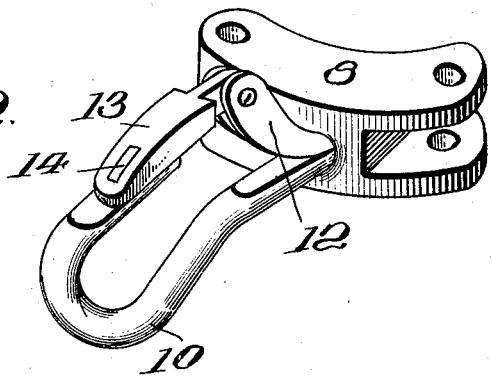
Witnesses
Floyd R. Cornwall
Inventor
S. M. Smith.
By
Attorney

UNITED STATES PATENT OFFICE.

STEPHEN M. SMITH, OF BOISE, IDAHO.

BLOCK-HOOK.

1,246,174. Specification of Letters Patent. Patented Nov. 13, 1917.

Original application filed September 5, 1916, Serial No. 118,571. Divided and this application filed January 8, 1917. Serial No. 141,185.

*To all whom it may concern:*

Be it known that I, STEPHEN M. SMITH, a citizen of the United States, residing at Boise, in the county of Ada and State of Idaho, have invented certain new and useful Improvements in Block-Hooks, of which the following is a specification.

This invention relates to block and tackle mechanism and more particularly to the attaching hook for snatch blocks and the like adapted to be used in connection with the flexible power transmitting means.

The present invention is a division of my co-pending application Serial Number 118,571, filed September 5, 1916.

One of the objects of the present invention is to provide a simple and practical attaching means or hook particularly adapted for use in connection with snatch blocks, which will be reliable and efficient in use and operation. A further object is to provide an improved hook and guard therefor adapted to prevent accidental removal of the flexible power transmitting means or cable attached to the hook.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which Figure 1 is a side elevation of a snatch block with the improved hook applied thereto with the guard in open position;

Fig. 2 is an enlarged perspective view of the hook in closed position.

Fig. 3 is a detail transverse sectional view of the hook.

Referring now to the drawings in detail and more particularly to Fig. 1, 5 represents a snatch block of any desired type having an attaching ring 6 at one end thereof and a pivoted cross member 8 connecting the two sides of the block at the opposite end. The hook which is mounted in this cross member 8 comprises a main member 10 curved at one end to form the hook and having its opposite end semicircular in cross section and passing through a hole in the central part of the member 8, as clearly shown in Fig. 2. Coacting with this shank portion is a second member 11 also having a semicircular cross section and the inner ends of both members 10 and 11 are flanged over at the base or inner side of the member 8 to prevent removal thereof through the circular opening in the member 8. This peculiar construction and method of attaching permits both members to have independent relative longitudinal movement. The member 11 has its outer end 12 bent sharply at right angles and has pivoted thereto a latch 13 provided with an opening near its outer end adapted to catch over an auxiliary hook 14 at the free end of the member 10.

When a rope or cable is attached to the hook it is preferable to open the latch 13 and pass the cable up into the crook of the hook 10. The latch is then snapped over the auxiliary hook 14 and any pull exerted on the rope will cause a relative longitudinal movement of the hook 10 with respect to the latch and firmly seat the latter in closed position. As long as this tension is exerted it is impossible to remove the latch.

It is thus seen that the present invention provides a simple and practical hook and lock therefor particularly adapted for use in connection with snatch blocks, although it is of course susceptible without material modification to ordinary blocks.

It is believed that the device is reliable and efficient in use and operation and is adapted to accomplish among others all of the objects and advantages herein set forth.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is—

1. In combination a transverse member adapted to form the end of a block or the like having a central opening, a hook having a shank mounted in said opening and longitudinally movable therein, a second member having a shank arranged parallel to said first mentioned shank and together completely filling said opening, means for preventing removal of said members from the opening, a latch carried by said last mentioned shank adapted to co-act with the end of the hook whereby when strain is exerted on said hook said latch will occupy a locking position and act as a guard for a flexible member passing through said hook.

2. In combination with a transverse member adapted to form the end of a block or the like, and having a central opening, a hook having a shank passing through said opening and partially filling the same, a second member having a shank also passing through said opening, the shanks of both members being flanged over to prevent removal, said last mentioned member having a latch pivotally mounted at its outer end adapted to coact with the end of the hook and act as a guard for a flexible member passing through said hook.

In testimony whereof I affix my signature in presence of two witnesses.

STEPHEN M. SMITH.

Witnesses:
CLINTON H. HARPER,
FRANCES E. DOWLING.

Copies of this patent may be obtained for five cents each, by addressing the "Commissioner of Patents, Washington, D. C."